Dec. 16, 1941.   J. M. LEAKE   2,266,499
DRIVING HUB FOR PULLEYS OR GEARS
Filed July 29, 1939

Inventor
James M. Leake

Patented Dec. 16, 1941

2,266,499

UNITED STATES PATENT OFFICE 2,266,499

DRIVING HUB FOR PULLEYS OR GEARS

James M. Leake, Toledo, Ohio, assignor to Toledo Stamping and Manufacturing Company, Toledo, Ohio, a corporation of Ohio Application July 29, 1939, Serial No. 287,342

2 Claims. (Cl. 287—52.05)

My invention relates to driving hubs for pulleys or gears and particularly to the type provided with a keyway.

Heretofore gears and pulleys have been made from forgings and castings in which the hub is an integral part of the gear or pulley. A hole is drilled or reamed in the hub and then a groove or keyway is cut in the hub. In many cases the faces or outer ends of the hub must be smooth. In the past this has been accomplished by machining these ends. This method of making driving hubs for pulleys or gears requires much machining and also a considerable amount of material is wasted in this machining process, consequently the driving hubs used at the present time are expensive. My improved type of driving hub is composed of stampings that are fabricated into a unit and then fastened to a pulley or gear. No machining is required to make my improved type of driving hub. Since my improved type of hub consists of stampings it is possible to get the same strength with less weight than is possible in the type of hub used at the present time.

One object of my invention is to provide a driving hub that eliminates all expensive machining operations.

Another object of my invention is to provide a driving hub that is light in weight.

Another object of my invention is to provide a driving hub that readily adapts itself to quantity production.

Another object of my invention is to provide a driving hub for gears or pulleys that is simple, durable, strong and inexpensive.

With these and other objects in view, my invention consists in the construction, combination and arrangement of the various parts of my improved device as described in the specification, claimed in the claims, and illustrated in the accompanying drawing.

Figure 1:
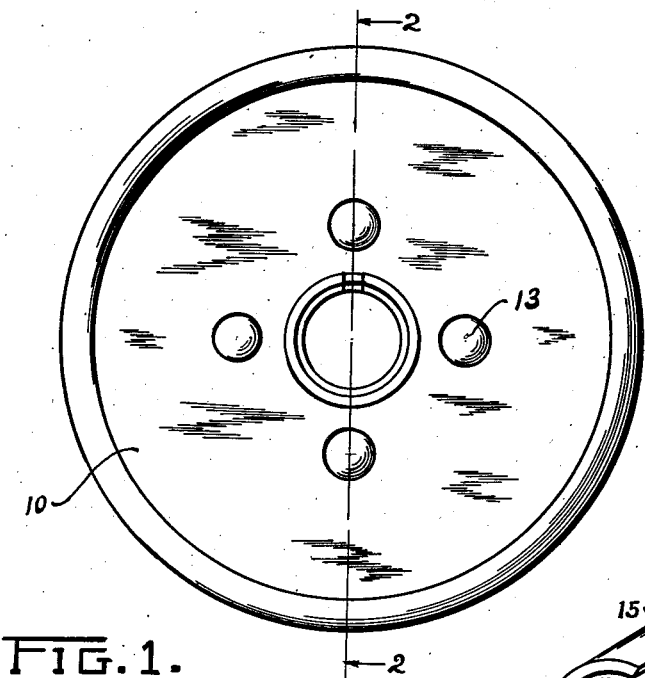
Fig. 1 is a side view of a pulley embodying my invention.
Figure 2:
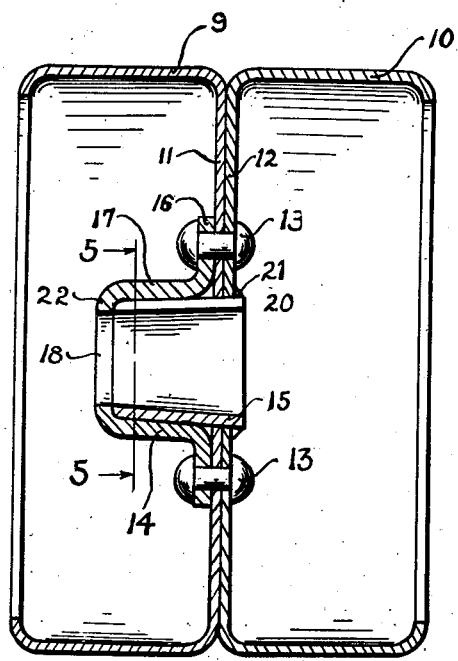
Fig. 2 is a sectional view taken along line 2—2 of Fig. 1.

Referring to the drawing I have shown in Figures 1 and 2 a pulley composed of stampings 9 and 10. The members 9 and 10 are provided with integral web members 11 and 12. The driving hub is composed of a stamped member 14 and a stamped bushing 15. The entire pulley is assembled as shown in Fig. 2 and then is permanently assembled by means of the rivets 13.

The stamped hub member 14 has an annular ring portion 16. A cup is drawn from the annular ring portion 16 thus forming the annular flanged portion 17. The bottom of the cup is then parallel to the ring portion 16. A hole 18 is then pierced in the bottom of the cup portion of the member 14 so that the diameter of the hole 18 corresponds to the inside diameter of the bushing 15.

Figure 5:
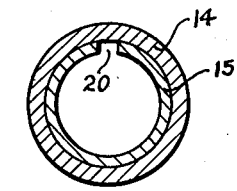
Fig. 5 is a sectional view taken along line 5—5 of Fig. 2.
Figure 4:
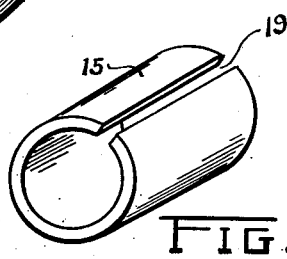
Fig. 4 is a pictorial view of the bushing used in my improved type of driving hub.
Figure 3:
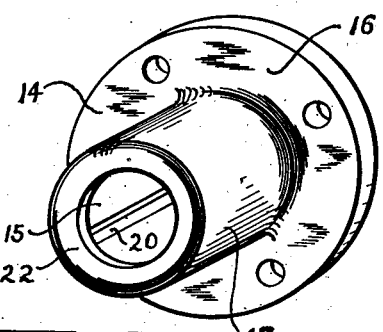
Fig. 3 is a pictorial view of an assembled hub of my improved type.

The bushing 15 does not form a complete cylinder. Its ends are a predetermined distance apart thus leaving an opening 19 in the cylinder as shown in Fig. 4. The faces forming the opening 19 are substantially parallel. The bushing 15 is inserted in the stamped hub member 14 as shown in Figs. 2 and 5. When the bushing 15 is inserted in the hub member 14 the opening 19 shown in Fig. 4 forms a keyway 20 as shown in Figs. 2, 3 and 5. The bushing 15 is fastened in the hub member 14 by means of copper-hydrogen brazing. The bushing 15 may also be welded to the web member 12 by means of a weld 21 if additional strength is required.

The bushing 15 and the annular flanged portion 17 may be perfectly cylindrical or they may be substantially so as shown in the drawing in which case they are actually a frustum of a cone.

The outer end of the annular flanged portion 17 is provided with a ring portion 22 which is substantially at right angles to the annular portion 17. This ring portion 22 adds considerable strength to the hub particularly at the point where the keyway 20 is located.

My improved type of hub construction is adapted for use in connection with a shaft and key, where power is transmitted from a pulley to a shaft through the medium of a key or vice versa.

From the foregoing description it can be readily seen that my improved type of driving hub has many advantages over those used at the present time. Greater strength can be secured with less weight because the metal used in stampings has greater strength per unit weight than does cast or forged metal. It also eliminates all machining which is a very expensive process.

It can readily be seen that several modifications of my invention can be made. In some cases it might be desirable to use a hub member 14 on both sides of the web members 11 and 12.

In some cases it might be desirable to assemble the entire unit by copper hydrogen brazing and thus eliminate the rivets 13. It can also readily be seen that my type of hub could be used in connection with wheels or gears as well as with a pulley as shown in the drawing.

While I have described the details of one form of my invention it is to be understood that I am not to be limited to these details except by the scope of the appended claims.

Having thus described my invention what I claim is:

1. A stamped hub for a pulley or a gear comprising; an outer stamping, said outer stamping having an annular ring adapted to be fastened to a pulley or a gear, and an annular flange struck outwardly from said ring; an inner member comprising a slotted substantially cylindrical member; a means for fastening said slotted substantially cylindrical member in said outer stamping; and a keyway, said outer stamping forming the bottom wall of said keyway and said slotted cylindrical inner member forming the side walls of said keyway.

2. A stamped hub for a pulley or a gear comprising; a unitary outer stamping, said outer stamping having an annular ring adapted to be fastened to a pulley or gear, an annular flange struck outwardly from said ring and an annular ring extending inwardly at substantially right angles to said annular flange; an inner member comprising a slotted substantially cylindrical member; a means for fastening said inner member in said outer stamping; and a keyway, said unitary outer stamping providing the bottom wall of said keyway and said inner member providing the side walls of said keyway.

JAMES M. LEAKE.